(12) United States Patent
Baker et al.

(10) Patent No.: US 6,860,205 B2
(45) Date of Patent: Mar. 1, 2005

(54) TEMPERATURE COMPENSATING INFLATION DEVICE

(75) Inventors: James J. Baker, La Pluta, MD (US); Jim Eskildsen, Tempe, AZ (US)

(73) Assignee: Universal Propulsion Company, Phoenix, AZ (US)

( * ) Notice: Subject to any disclaimer, the term of this patent is extended or adjusted under 35 U.S.C. 154(b) by 36 days.

(21) Appl. No.: 10/184,716

(22) Filed: Jun. 26, 2002

(65) Prior Publication Data

US 2004/0000617 A1 Jan. 1, 2004

(51) Int. Cl.[7] ................................................. C06D 5/00
(52) U.S. Cl. .................... 102/129.1; 102/530; 102/531; 280/735; 280/742
(58) Field of Search ................................ 102/530–531; 280/735, 742, 741, 737, 736; 244/129.1

(56) References Cited

U.S. PATENT DOCUMENTS

| | | | | |
|---|---|---|---|---|
| 3,458,009 A | | 7/1969 | Favors | |
| 3,731,843 A | * | 5/1973 | Anderson, Jr. | 280/737 |
| 4,213,635 A | * | 7/1980 | Inokuchi et al. | 280/737 |
| 4,368,009 A | | 1/1983 | Heimovics, Jr. et al. | |
| 5,263,740 A | * | 11/1993 | Frey et al. | 280/737 |
| 5,335,598 A | | 8/1994 | Lewis et al. | |
| 5,344,186 A | * | 9/1994 | Bergerson et al. | 102/530 |
| 5,350,192 A | * | 9/1994 | Blumenthal | 280/737 |
| 5,468,015 A | * | 11/1995 | Goetz | 280/737 |
| 5,580,085 A | | 12/1996 | Cuevas et al. | |
| 5,613,702 A | * | 3/1997 | Goetz | 280/741 |
| 5,820,162 A | * | 10/1998 | Fink | 280/741 |
| 5,906,394 A | * | 5/1999 | Van Wynsberghe et al. | 280/737 |
| 5,988,438 A | * | 11/1999 | Lewis et al. | |
| 5,992,881 A | * | 11/1999 | Faigle | 102/531 |
| 6,161,481 A | * | 12/2000 | Shirk et al. | 102/530 |
| 6,168,199 B1 | * | 1/2001 | Faigle | |
| 6,196,584 B1 | * | 3/2001 | Shirk et al. | 280/737 |
| 6,237,950 B1 | * | 5/2001 | Cook et al. | 102/531 |
| 6,382,668 B1 | * | 5/2002 | Goetz | 280/737 |
| 6,386,583 B1 | * | 5/2002 | Erike | 280/737 |

FOREIGN PATENT DOCUMENTS

| | | | |
|---|---|---|---|
| EP | 0742125 | 5/1996 | |
| GB | 2342622 | 10/1998 | |
| US | EP 0 742 125 A2 * | 11/1996 | 280/741 |

* cited by examiner

Primary Examiner—Michael J. Carone
Assistant Examiner—L. Semunegus
(74) Attorney, Agent, or Firm—Jerry Holden; John D. Titus

(57) ABSTRACT

A dual stage hybrid inflation device includes a pressure switch that prevents the second stage pyrotechnic gas generator from being initiated when the additional heat and gas would overpressurize the first stage pressure vessel. As the pressurized gas stored in the first stage pressure vessel escapes the first stage pressure vessel, the pressure in the first stage pressure vessel drops. If the pressure in the first stage pressure vessel drops below the threshold pressure of the pressure switch, the pressure switch closes allowing the voltage signal to reach the pyrotechnic gas generator thereby initiating the second stage gas source. In an alternative embodiment, the pressure transducer is replaced by a pressure transducer or a temperature transducer and timing circuit. By delaying the initiation of the second stage gas source until after the pressure in the first stage pressure vessel has dropped below the threshold level, the appropriate augmentation of the compressed first stage gas can be realized without the necessity of designing the first stage pressure vessel to withstand initiation of the pyrotechnic gas generator under maximum inflation pressure conditions.

43 Claims, 4 Drawing Sheets

TEMPERATURE COMPENSATING INFLATION DEVICE

BACKGROUND OF THE INVENTION

This invention relates to emergency evacuation equipment for aircraft. In particular, this invention relates to an inflation device for inflating an inflatable aircraft evacuation slide or other inflatable device.

The requirement for reliably evacuating airline passengers in the event of an emergency is well known. Emergencies at take-off and landing often demand swift removal of the passengers from the aircraft because of the potential for injuries from fire, explosion, or sinking in water. A conventional method of quickly evacuating a large number of passengers from an aircraft is to provide multiple emergency exits, each of which is equipped with an inflatable evacuation slide. Current state of the art emergency evacuation slide systems comprise an inflatable evacuation slide which is stored in an uninflated folded state together with a source of inflation gas. The source of inflation gas typically comprises a gas generator, stored compressed gas, or a combination thereof. Pyrotechnic gas generators have an advantage in that they are small, lightweight, and produce a high volume of gas, however, the high temperature gas produced by a gas generator alone can cause numerous problems including sagging of the evacuation slide as the inflation gas cools and, in some cases, melting of the fabric out of which the inflation slide if fabricated. Use of stored compressed gas by itself, although simple, implicates a weight penalty that must be paid for carrying a pressure vessel having sufficient capacity (in terms of volume and pressure) to inflate the evacuation slide over the wide operational temperature range specified for such slides. Additionally, where only a compressed gas is used to inflate the evacuation slide, a large drop in temperature occurs as the gases expand, often causing ice to form, which can block the flow of gas. Accordingly, state-of-the-art emergency evacuation slide evacuation systems typically comprise a hybrid inflator, which utilizes a stored compressed gas together with a pyrotechnic gas generator. The pyrotechnic gas generator augments the stored compressed gas by providing additional gas, as well as heat to counteract the effects of the expansion-induced cooling of the compressed gas as it expands out of the pressure vessel.

To further augment the volume of gas delivered to the evacuation slide, many evacuation systems utilize aspirators such as that disclosed in U.S. Pat. No. 4,368,009 to Heimovics, et al. As the compressed gas flows through the aspirator, a venturi is produced that causes the aspirator to pump about two to three times as much gas as is supplied by the compressed gas source alone.

Despite these advances, there still exist problems due to the wide ambient temperature range over which these inflation systems are required to operate, typically from −65° F. to +165° F. The amount of gas available must be enough to pressurize the evacuation slide at the coldest temperature. However, because of the relationship between pressure and temperature within a fixed volume, as the ambient temperature rises above the minimum, the pressure within the pressure vessel rises proportionately. Accordingly, in current state-of-the-art hybrid inflation systems, the storage vessel must be capable of withstanding the pressure of the compressed gas at 165° F. Not only this, but the storage vessel must withstand the overpressure at 165° F. caused by the pyrotechnic gas generator, even though use of the pyrotechnic gas generator at 165° F. causes the inflation system to produce substantially more gas than is necessary to inflate the evacuation slide. Additionally, the substantial overpressure caused at high temperature further increases the weight of the system, because additional Pressure Relief Valves (PRV's) must be incorporated into the evacuation slide to vent the excess gases.

Accordingly, what is needed is a system for tailoring initiation of the pyrotechnic gas generator in a hybrid compressed gas/pyrotechnic inflation device to prevent overpressurization of the compressed gas pressure vessel over a wide range of temperatures.

SUMMARY OF THE INVENTION

The present invention comprises a dual stage hybrid inflation device including a first stage gas source comprising a pressurized gas stored in a first stage pressure vessel and a second stage gas source having a gas output directed into the first stage pressure vessel. According to an embodiment of the present invention, the first stage pressure vessel is in fluid communication with an inflatable device such as an aircraft emergency evacuation slide via a combination valve/regulator and one or more conventional aspirators. A pressure transducer (or normally open pressure switch) senses the pressure in the first stage pressure vessel. The inflation system is initiated by a voltage signal, for example from a sensor mounted to detect opening of the aircraft door. The voltage signal opens the valve of the first stage pressure vessel and simultaneously sends a voltage signal to arm the firing circuit for the pyrotechnic gas generator comprising the second stage gas source. The pressure switch, which is normally open above a threshold pressure, interrupts a voltage signal to or from the firing circuit, which causes the firing circuit to delay initiation of the pyrotechnic gas generator if the pressure in the first stage pressure vessel is above the threshold level. This prevents the pyrotechnic gas generator from being initiated when the additional heat and gas would overpressurize the first stage pressure vessel. As the pressurized gas stored in the first stage pressure vessel escapes the first stage pressure vessel into the inflatable evacuation slide, the pressure in the first stage pressure vessel drops. If the pressure in the first stage pressure vessel drops below the threshold pressure of the pressure switch, the pressure switch closes, which permits the firing circuit to initiate the second stage gas source. By delaying the initiation of the second stage gas source until after the pressure in the first stage pressure vessel has dropped below the threshold level, the appropriate augmentation of the compressed first stage gas can be realized without the necessity of designing the first stage pressure vessel to withstand initiation of the pyrotechnic gas generator under maximum inflation pressure conditions. This enables the first stage pressure vessel to be of a lighter weight construction thereby saving substantially both in costs and fuel savings for the aircraft on which such systems are installed.

In an alternative embodiment the pressure switch is replaced with a pressure transducer. An external circuit monitors the pressure signal and closes a circuit or otherwise provides a signal to the second stage gas source when the pressure has dropped below the threshold level. In another alternative embodiment, the pressure transducer is replaced by a temperature transducer. An external timing circuit closes a circuit or otherwise sends a signal to initiate the second stage gas source based on known pressure versus time behavior of the inflation system.

DETAILED DESCRIPTION

Figure 1:
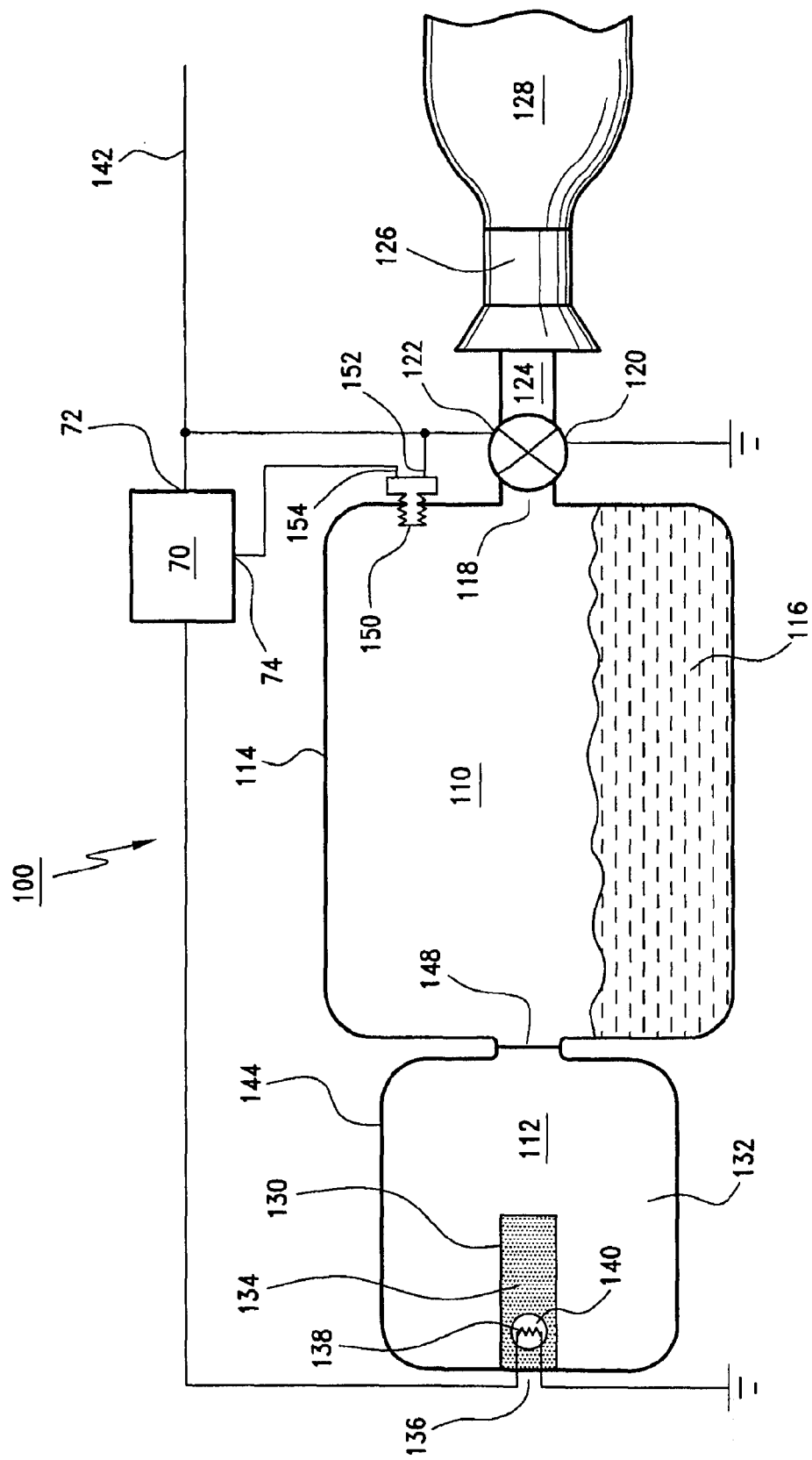
FIG. 1 is a partially schematic sectional view of an inflator incorporating features of the present invention.

The drawing figures are intended to illustrate the general manner of construction and are not necessary to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

The present invention is directed to a method and apparatus for inflating an inflatable device such as an aircraft emergency evacuation slide over a wide range of operating temperatures. An inflator incorporating features the present invention is shown in FIG. 1. Inflator 100 comprises a first stage gas source 110 and a second stage gas source 112. First stage gas source 110 comprises a pressure vessel 114 containing a mixture of compressed inflation gases 116. In the illustrative example of FIG. 1, inflation gas mixture 116 comprises approximately a 2:1 ratio of carbon dioxide to argon. In general, however, the mixture of inflation gases, as well as the ratio of gases, can vary based on the particular application. Because carbon dioxide liquifies at ambient temperatures at a relatively modest pressure, depending on the ambient temperature, some or all of the carbon dioxide component of inflation gas mixture 116 will be in a liquid state. Accordingly, as used herein the term compressed gas means and refers to gas that is in a gaseous state under pressure as well as gas that has changed phase to a liquid state under pressure. Pressure vessel 114 has a gas exit opening 118 to which is attached a regulator valve 120. Regulator valve 120 is normally closed but is remotely electrically actuated via an input terminal 122 which is adapted to receive a voltage signal that opens regulator valve 120 in a conventional manner. Regulator valve 120 is in fluid communication with an output duct 124 leading to the inflatable device 128 through one or more conventional aspirators 126.

Although an argon/carbon dioxide mixture is disclosed in the embodiment of FIG. 1, any of the pressurized inflation gases well known in the art may be used for inflation gas mixture 116. For example, gases that may be utilized in accordance with the present invention either alone or in combination include, but are not limited to carbon dioxide, nitrogen, chlorofluorocarbons, bromofluorocarbons, nitrous oxide and argon. The combination of carbon dioxide and argon is preferred, however, because of the ability of carbon dioxide to liquify, and thus require a minimum of storage volume, and the high specific heat of argon which enables it to absorb substantial heat from a pyrotechnic gas generator.

Second stage gas source 112 comprises a pyrotechnic gas generator 130 either alone or in combination with a compressed gas 132 (such as disclosed in U.S. Pat. No. 5,988,438 to Lewis, et al. and assigned to the Assignee of the present invention). Pyrotechnic gas generator 130 comprises a pyrotechnic material 134 which may either be in stick form or pressed into a container (not shown). Pyrotechnic material 134 is initiated by an initiator or squib 136 comprising a bridge wire 138 and an initiation composition 140. Pyrotechnic material 134 may be any pyrotechnic gas generator material such as sodium-azide, or lithium-azide coupled with an oxidizer such as sodium nitrate, potassium nitrate, potassium perchlorate and the like but preferably comprises ammonium nitrate in combination with a secondary explosive such as cyclotrimethylene trinitramine (RDX); cyclotetramethylene tetranitramine (HMX); pentaerythritol tetranitrate (PETN), hexanitrohexaazaisowurtzitane (CL20) or similar energizers that produce a high volume of gaseous combustion products with little or no particulates. A most preferred gas generator material is UPCO 8043, a slow burning, relatively insensitive ammonium nitrate base propellant available from Universal Propulsion Company, Inc. of Phoenix, Ariz. The initiation composition 140 may be any heat sensitive primary explosive such as a mixture of zirconium or titanium with potassium perchlorate, boron calcium chromate, lead styphnate or similar primary explosive suitable for use in hot wire electro explosive devices.

In operation, upon an initiation event, such as the opening of an aircraft emergency exit door in the "armed" position, a voltage signal is transmitted along input conductor 142 to input terminal 122 of regulator valve 120, input terminal 152 of pressure switch 150, and input terminal 72 of firing circuit 70. The signal received at input terminal 122 of regulator valve 120 causes regulator valve 120 to open immediately, beginning the flow of inflation gas mixture 116 through output duct 124 into inflatable device 128. The signal received at input terminal 72 of firing circuit 70 simultaneously arms firing circuit 70. Firing circuit 70 may be may be a safe and arming firing circuit such as disclosed in U.S. Pat. No. 5,335,598, the teaching of which is incorporated herein by reference to the extent necessary to supplement this specification. The valve portion of regulator valve 120 may be a conventional solenoid operated valve, explosively initiated valve or other conventional valve that may be remotely actuated. Additionally, although regulator valve 120 in the illustrative embodiment of FIG. 1 is electrically actuated, regulator valve 120 may also be mechanically actuated (e.g. by a lanyard or other mechanical means) in which case other means for simultaneously applying a voltage to input terminal 152 of pressure switch 150 and input terminal 72 of firing circuit 70 (e.g. a switch applying a battery voltage) would be provided. Similarly, although the regulator portion of regulator valve 120 in the illustrative embodiment is a conventional sliding spool regulator, other regulation means, such as a simple orifice may be used in accordance with the present invention. In the illustrative embodiment of FIG. 1, the pressure within pressure vessel 114 may be from approximately 1,000 psi at −65° F. to 4,000 psi at 165° F. The aspirator 126, however, performs most efficiently with an inlet pressure of 400 psi. Therefore, in addition to providing the opening function upon initiation, regulator valve 120 also operates to regulate the pressure within pressure vessel 114 down to 400 psi at the inlet to aspirator 126.

Pressure switch 150 is normally open above a threshold pressure (e.g. 2,000 psi). Accordingly, as long as the pressure within pressure vessel 114 is above the threshold pressure of pressure switch 150, the voltage signal at input terminal 152 of pressure switch 150 does not appear at output terminal 154 of pressure switch 150 and thus does not appear at trigger terminal 74 of firing circuit 70. As a result, firing circuit 70 does not initiate pyrotechnic gas generator 130. When the pressure in pressure vessel 114 drops below the threshold pressure of pressure switch 150, however, pressure switch 150 closes and the voltage signal at input terminal 152 is transmitted to the trigger terminal 74 of firing circuit 70, which in turn causes firing circuit 70 to initiate squib 136 of pyrotechnic gas generator 130. Upon initiation of pyrotechnic gas generator 130 the pressure in second stage pressure vessel 144 rises until burst disk 148 ruptures allowing the high temperature gas from second stage gas source to enter first stage pressure vessel 114 thereby raising the pressure inside pressure vessel 114 and vaporizing any remaining liquified constituent of inflation gas mixture 116. By delaying the initiation of pyrotechnic gas generator 130 until the pressure in pressure vessel 114 has dropped below the threshold level, inflatable device 128 is inflated rapidly, yet the peak pressure exerted on pressure vessel 114 does not exceed the maximum operating pressure of the pressure vessel irrespective of the operating temperature of the system.

Figure 2:
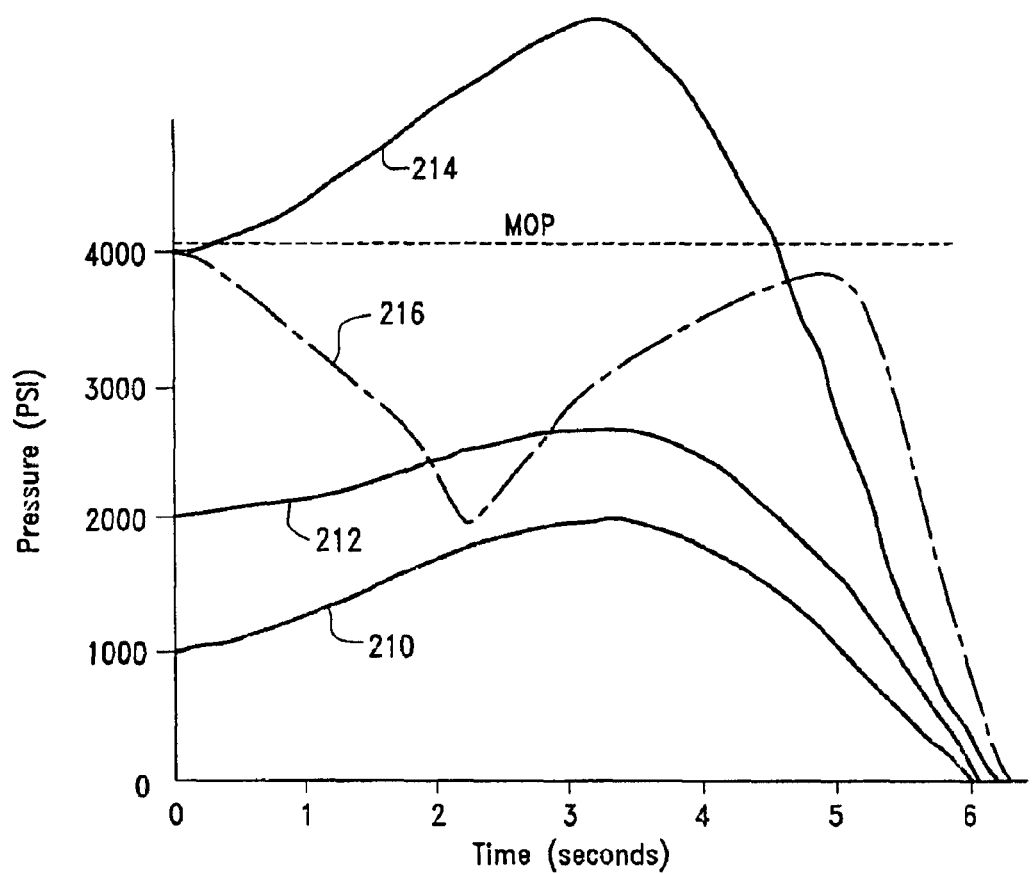
FIG. 2 is an illustrative projected pressure-time profile of the pressure output of the embodiment of FIG. 1 operating at three different operating temperatures.

This advantage of an inflator constructed in accordance with the teachings of the present invention can be best understood with reference to FIG. 2, which illustrates projected pressure-time profiles of the illustrative embodiment of FIG. 1 operating at three different operating temperatures. The pressure-time profile at −65° F. is represented by the line having reference numeral 210. At −65° F., the initial pressure in first stage pressure vessel 114 is 1,000 psi, which is below the 2,000 psi threshold pressure of pressure switch 150. Accordingly, pressure switch 150 is closed. Therefore, when a voltage signal is received along input conductor 142, squib 136 initiates pyrotechnic gas generator 130 simultaneous with the opening of regulator valve 120. Similarly, at +70° F., represented by the line having reference numeral 212, the initial pressure in first stage pressure vessel 114 is 2,000 psi. Accordingly, pressure switch 150 is just at the point of closing. Therefore, when a voltage signal is received along input conductor 142, squib 136 initiates pyrotechnic gas generator 130 simultaneous with the opening of regulator valve 120.

However, at 165° F., the initial pressure in first stage pressure vessel 114 is already 4,000 psi. If the pyrotechnic gas generator 130 were initiated simultaneous with the opening of valve 120, as indicated by the line having reference numeral 214, the pressure inside first stage pressure vessel 114 would rise rapidly to in excess of 5,000 psi, substantially above the 4,100 psi maximum operating pressure (MOP) of first stage pressure vessel 114. With the incorporation of pressure switch 150, however, as indicated by the line having reference numeral 216, upon receipt of a voltage signal along input conductor 142, regulator valve 120 opens and the pressure within first stage pressure vessel 114 begins to drop as gas expands out of first stage pressure vessel 114. Only when the pressure in first stage pressure vessel 114 drops below the threshold pressure of pressure switch 150 is the voltage signal communicated to bridge wire 138 of squib 136 thereby initiating pyrotechnic gas generator 130. Upon the initiation pyrotechnic gas generator 130, the pressure in first stage pressure vessel 114 rises again, however, it does not exceed the 4,100 psi MOP of first stage pressure vessel 114.

As is evident from the foregoing, there may be instances for systems with extremely wide operating temperature ranges that a hybrid gas generator/compressed gas inflator having sufficient capacity to inflate an inflatable device at the coldest temperature may not require the gas generator to function at all at the highest temperature range. Accordingly, a simple timing circuit or other device may be incorporated to preclude the initiation of the pyrotechnic gas generator if the pressure does not drop below the threshold pressure within a predetermined period of time (e.g. within the first four seconds after opening the regulator valve). In this case, the inflatable device will simply be inflated completely using the compressed gas without having to vent the excess inflation gas that would be produced by the gas generator.

Figure 3:
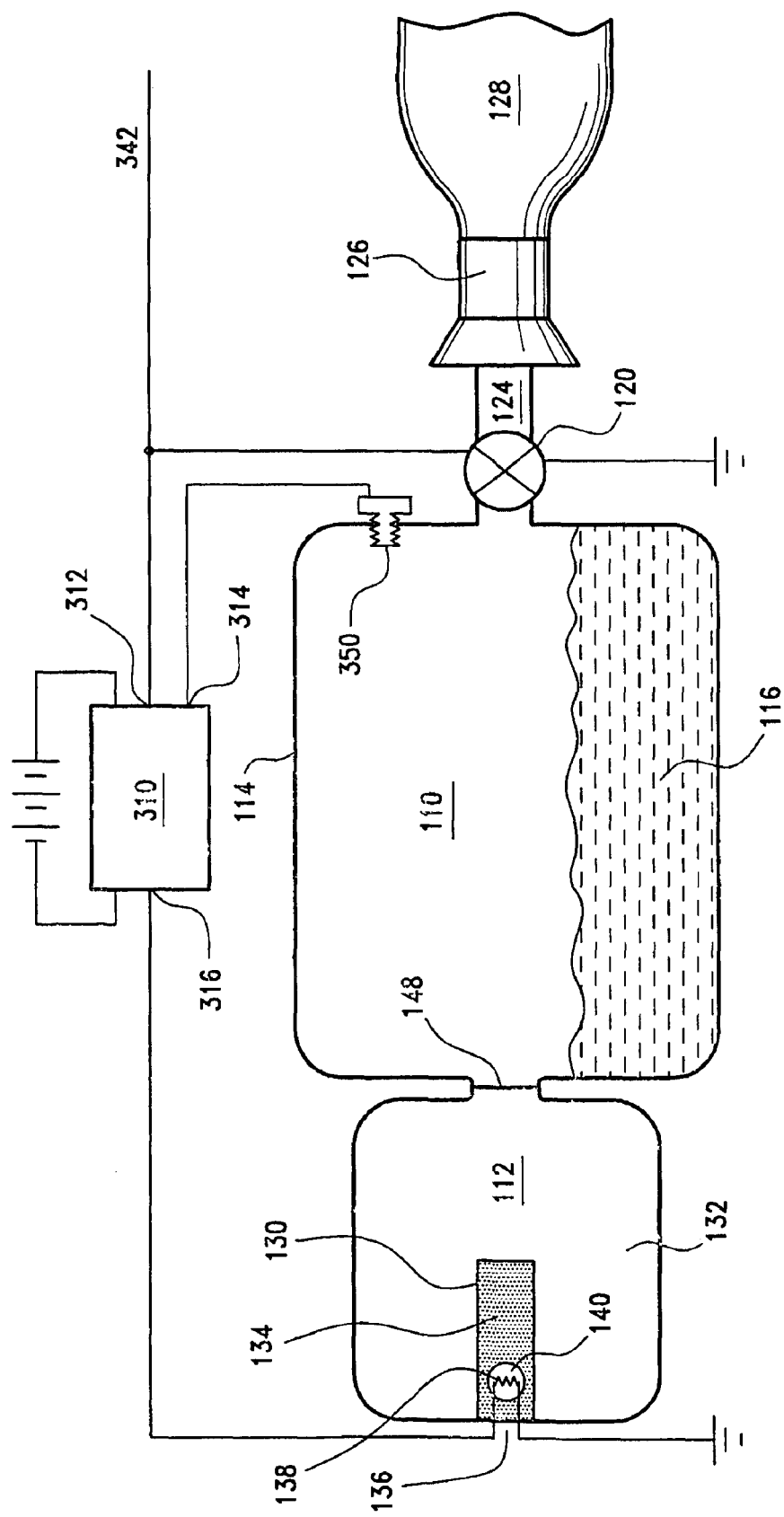
FIG. 3 is a partially schematic sectional view of an alternative embodiment of an inflator incorporating features of the present invention.

An alternative embodiment of an inflator incorporating features of the present invention is shown in FIG. 3. In the embodiment of FIG. 3, pressure switch 150 is replaced with a pressure transducer 350. Initiation of pyrotechnic gas generator 130 is controlled by an external initiation circuit 310, which may be a safe and arming firing circuit such as disclosed in U.S. Pat. No. 5,335,598, the teaching of which is incorporated herein by reference to the extent necessary to supplement this specification. In operation, a voltage signal is received along input conductor 342 from an external source such as a sensor mounted to an aircraft emergency evacuation door. As with the embodiment of FIG. 1, the voltage signal causes regulator valve 120 to open immediately allowing the inflation gas mixture 116 to begin to flow into inflatable device 128 via aspirator 126. Simultaneously, the voltage signal is received at input terminal 312 of circuit 310. Circuit 310 monitors the pressure signal from pressure transducer 350 via input 314 and produces a firing signal to initiator 136 via output 316 when the pressure signal from pressure transducer 350 indicates that the pressure in first stage pressure vessel 114 has dropped below the predetermined threshold. The advantage of using an external 310 over the simple series connection of the embodiment of FIG. 1 is that circuit 310 can include additional circuitry for monitoring the status of pressure transducer 350 and provide an error signal in the event pressure transducer 350 shows an out-of-range reading or otherwise appears to be malfunctioning.

Figure 4:
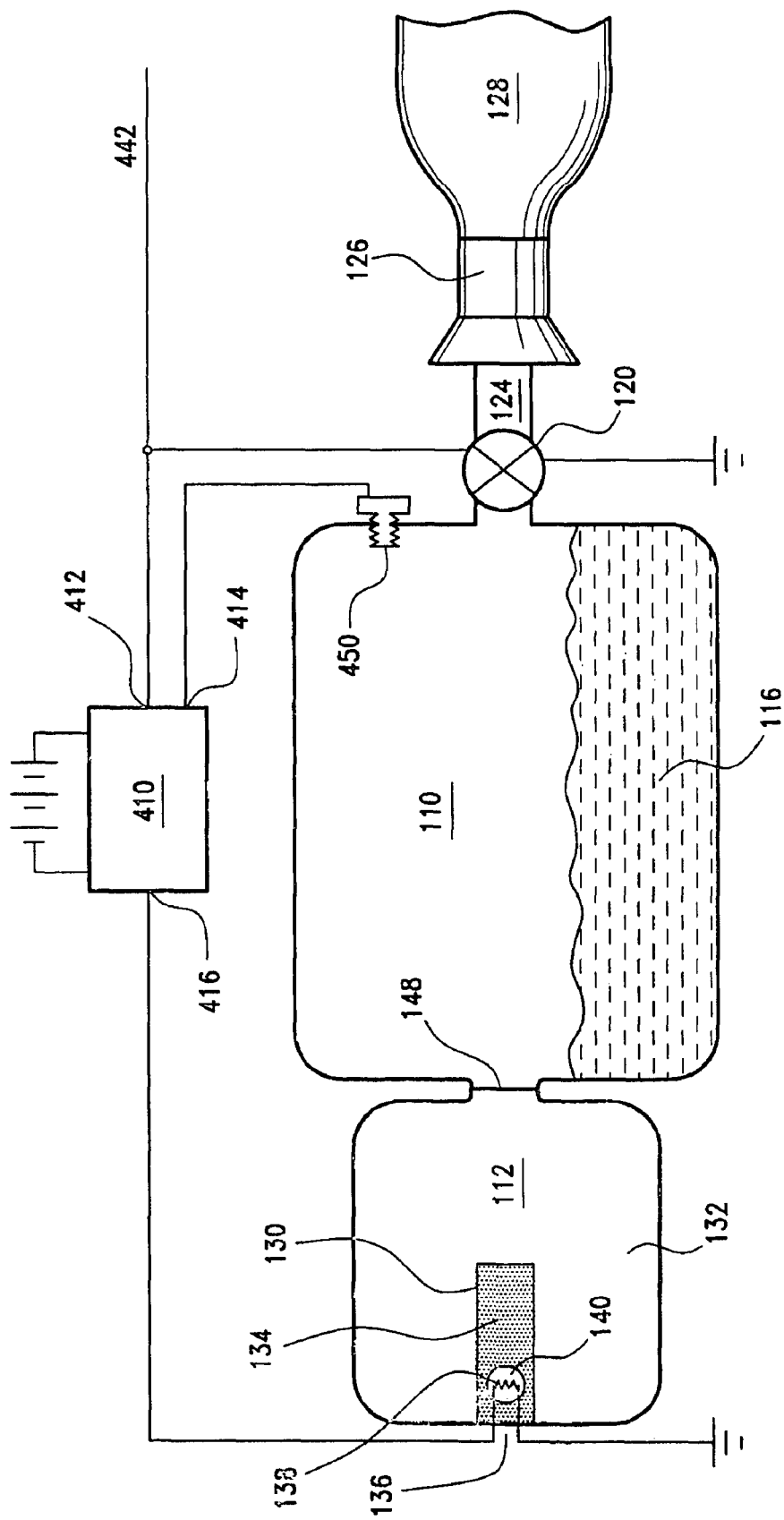
FIG. 4 is a partially schematic sectional view of another alternative embodiment of an inflator incorporating features of the present invention.

FIG. 4 depicts another alternative embodiment of an inflator incorporating features of the present invention. In the embodiment of FIG. 4, the pressure transducer 350 has been replaced with a temperature transducer 450 and circuit 310 has been replaced with timing and firing circuit 410. In operation, a voltage signal is transmitted along input conductor 442 in response to the opening of an aircraft emergency evacuation door. As with the embodiment of FIG. 1, the voltage signal causes regulator valve 120 to open immediately to allow inflation gas mixture 116 to begin inflating inflatable device 128 via aspirator 126. Simultaneously, the voltage signal is received at input 412 of timing/firing circuit 410. Since the temperature pressure decay rate of inflation gas mixture 116 in first stage pressure vessel 114 can be characterized, timing/firing circuit 410 can be preprogrammed to initiate squib 136 after a predetermined delay based on the temperature signal received from temperature transducer 450 at input 414 of timing/firing circuit 410. The advantage of using a timing/firing circuit 410 is that a temperature transducer such as a thermocouple may be less costly to incorporate into first stage pressure vessel 114 and may be more reliable since a thermocouple involves no moving parts.

Although certain illustrative embodiments and methods have been disclosed herein, it will be apparent from the foregoing disclosure to those skilled in the art that variations and modifications of such embodiments and methods may be made without departing from the spirit and scope of the invention for example a pressure switch could be interposed between the firing circuit and the squib of the embodiment of FIG. 1 to simply interrupt the firing signal. Accordingly, it is intended that the invention shall be limited only to the extent required by the appended claims and the rules and principals of applicable law.

What is claimed is:

1. Apparatus for inflating an inflatable device comprising:
   a first stage gas source comprising;
      a first stage pressure vessel having a gas exit opening,
      a pressurized cold gas stored within said first stage pressure vessel, and
      a remotely actuated valve, in fluid communication with said gas exit opening and responsive to an external signal for opening to provide a gas flow path between said first stage pressure vessel and said inflatable device;
   a second stage gas source having a gas output directed into said first stage pressure vessel;
   an initiator for initiating said second stage gas source,
   a sensor having an output signal indicative of one of the physical properties of the pressurized cold gas consisting of temperature and pressure; and
   an electronic circuit having an input for receiving a signal from said sensor and an output for initiating said second stage gas source, said electronic circuit operating to delay initiation of said second stage gas source for a period of time after said remotely actuated valve opens, the length of said period of time being determined, based upon said output signal from said sensor, to be sufficient to ensure the pressure of said pressurized cold gas is below a predetermined level.

2. The apparatus of claim 1, wherein:
   said remotely actuated valve is electrically actuated.

3. The apparatus of claim 1, wherein:
   said second stage gas source comprises a pyrotechnic gas generator.

4. The apparatus of claim 1, wherein:
   said sensor having an output signal indicative of one of the physical properties of the pressurized cold gas comprises a pressure transducer.

5. The apparatus of claim 4, wherein:
   said electronic circuit comprises means for receiving a voltage signal indicative of the opening of said remotely actuated valve and wherein said pressure transducer is interposed between said signal indicative of the opening of said remotely actuate valve and said second stage gas source such that said signal is interrupted until the pressure of said pressurized cold gas drops below said predetermined level.

6. The apparatus of claim 5, further comprising:
   means for generating a voltage signal indicative of the opening of an aircraft emergency evacuation exit door, said voltage signal operating to open said remotely actuated valve and to provide said voltage signal indicative of the opening of said remotely actuated valve.

7. The apparatus of claim 1, wherein:
   said sensor having an output signal indicative of one of the physical properties of the pressurized cold gas comprises a temperature transducer.

8. The apparatus of claim 7, wherein:
   said electronic circuit comprises an electronic timing circuit having a first input for receiving a signal indicative of the opening of said remotely actuated valve, a second input for receiving a signal from said temperature transducer and an output for providing a delayed signal for initiating said second stage gas source.

9. Apparatus for inflating an inflatable device comprising:
   a first stage gas source comprising;
      a first stage pressure vessel having a gas exit opening,
      a pressurized cold gas stored within said first stage pressure vessel, and
      a remotely actuated valve, in fluid communication with said gas exit opening and responsive to an external signal for opening to provide a gas flow path between said first stage pressure vessel and said inflatable device;
   a second stage gas source comprising;
      a second stage pressure vessel having a gas exit aperture in fluid communication with said first stage pressure vessel;
      a frangible seal disposed in said gas exit aperture, said frangible seal operable to open said gas exit aperture to permit gas to flow through said gas exit aperture when pressure in said second stage pressure vessel exceeds a predetermined level;
      a compressed gas stored within said second stage pressure vessel; and
      a pyrotechnic material contained within said second stage pressure vessel,
   an initiator for initiating said second stage gas source,
   a sensor having an output signal indicative of one of the physical properties of the pressurized cold gas consisting of temperature and pressure; and
   a electronic circuit having an input for receiving a signal from said sensor and an output for initiating said second stage gas source, said electronic circuit operating to delay initiation of said second stage gas source for a period of time after said remotely actuated valve opens, the length of said period of time being determined, based upon said output signal from said sensor, to be sufficient to ensure the pressure of said pressurized cold gas is below a predetermined level.

10. The apparatus of claim 9, wherein:
    said sensor having an output signal indicative of one of the physical properties of the pressurized cold gas comprises a pressure transducer.

11. The apparatus of claim 10, wherein:
    said electronic circuit comprises means for receiving a voltage signal indicative of the opening of said remotely actuated valve, wherein said pressure transducer is interposed between said signal indicative of the opening of said remotely actuate valve and said second stage gas source such that said signal is interrupted until the pressure of said pressurized cold gas drops below said predetermined level.

12. The apparatus of claim 11, further comprising:
    means for generating a voltage signal indicative of the opening of an aircraft emergency evacuation exit door, said voltage signal operating to open said remotely actuated valve and to provide said voltage signal indicative of the opening of said remotely actuated valve.

13. The apparatus of claim 9, wherein:
    said sensor having an output signal indicative of one of the physical properties of the pressurized cold gas comprises a temperature transducer.

14. The apparatus of claim 13, wherein:
    said electronic circuit comprises an electronic timing circuit having a first input for receiving a signal indicative of the opening of said remotely actuated valve, a second input for receiving a signal from said temperature transducer and an output for providing a delayed signal for initiating said second stage gas source.

15. Apparatus for inflating an inflatable device comprising:
   a first stage gas source comprising;
      a first stage pressure vessel having a gas exit opening,
      a pressurized cold gas stored within said first stage pressure vessel,
      a remotely actuated valve, in fluid communication with said gas exit opening and responsive to an external signal for opening to provide a gas flow path between said first stage pressure vessel and said inflatable device; and
      an aspirator disposed between said remotely actuated valve and said inflatable device,
   a second stage gas source comprising a pyrotechnic material having a gas output directed into said first stage pressure vessel;
   an initiator for initiating said second stage gas source,
   a sensor for measuring the pressure of the pressurized cold gas; and
   a electronic circuit having an input for receiving a signal from said sensor and an output for initiating said second stage gas source, said electronic circuit operating to delay initiation of said second stage gas source until after said remotely actuated valve has opened and the pressure of said pressurized cold gas drops below a predetermined level.

16. The apparatus of claim 15, wherein:
said sensor having an output signal indicative of one of the physical properties of the pressurized cold gas comprises a pressure transducer.

17. The apparatus of claim 16, wherein:
said electronic circuit comprises means for receiving a voltage signal indicative of the opening of said remotely actuated valve, wherein said pressure transducer is interposed between said signal indicative of the opening of said remotely actuate valve and said second stage gas source such that said signal is interrupted until the pressure of said pressurized cold gas drops below said predetermined level.

18. The apparatus of claim 17, further comprising:
means for generating a voltage signal indicative of the opening of an aircraft emergency evacuation exit door, said voltage signal operating to open said remotely actuated valve and to provide said voltage signal indicative of the opening of said remotely actuated valve.

19. The apparatus of claim 15, wherein:
said sensor having an output signal indicative of one of the physical properties of the pressurized cold gas comprises a temperature transducer.

20. The apparatus of claim 19, wherein:
said electronic circuit comprises an electronic timing circuit having a first input for receiving a signal indicative of the opening of said remotely actuated valve, a second input for receiving a signal from said temperature transducer and an output for providing a delayed signal for initiating said second stage gas source.

21. A method for inflating an inflatable device comprising:
   storing a first stage gas in a first stage pressure vessel;
   sensing one of the physical properties of said first stage gas consisting of temperature and pressure with a transducer and providing an output signal indicative said of one of the physical properties of said first stage gas;
   opening a remotely operated valve in response to an external signal to release said first stage gas through said valve into said inflatable device; and
   thereafter initiating a second stage gas source having a gas output directed into said first stage pressure vessel, said initiating of said second stage gas source occurring after a delay period, the length of said delay period being determined to be sufficient to ensure the pressure of said pressurized cold gas is below a predetermined level based on said output signal indicative of said one of the physical properties of said first stage gas,
   whereby said second stage gas source augments said first stage gas flowing through said valve into said inflatable device.

22. The method of claim 21, wherein:
said one of the physical properties of said first stage gas comprises the pressure of said first stage gas.

23. The method of claim 22, wherein:
said one of the physical properties of said first stage gas comprises the temperature of said first stage gas.

24. The method of claim 21, wherein:
said second stage gas source comprises:
   a second stage pressure vessel having a gas exit aperture in fluid communication with said first stage pressure vessel;
   a frangible seal disposed in said gas exit aperture, said frangible seal operable to open said gas exit aperture to permit gas to flow through said gas exit aperture when pressure in said second stage pressure vessel exceeds a predetermined level;
   a compressed gas stored within said second stage pressure vessel; and
   a pyrotechnic material contained within said second stage pressure vessel,
wherein said means for initiating said second stage gas source comprises an electrically initiated squib operable to initiate said pyrotechnic material.

25. The method of claim 21, wherein:
said external signal comprises a signal indicative of the opening of an aircraft emergency exit door.

26. The method of claim 21, further comprising:
flowing said first stage gas through an aspirator to entrain ambient air prior to said first stage gas flowing into said inflatable device.

27. A method for inflating an inflatable device comprising:
   storing a first stage gas in a first stage pressure vessel;
   sensing the pressure of said first stage gas;
   opening a remotely operated valve in response to an external signal to release said first stage gas through said valve into said inflatable device; and
   thereafter initiating a second stage gas source having a gas output directed into said first stage pressure vessel, said initiating of said second stage gas source occurring after a delay period, the length of said delay period being equal to the time necessary for the sensed pressure of said first stage gas to drop below a predetermined level, whereby said second stage gas source augments said first stage gas flowing through said valve into said inflatable device.

28. The method of claim 27, wherein:
said external signal comprises a signal indicative of the opening of an aircraft emergency exit door.

29. The method of claim 27, further comprising:
flowing said first stage gas through an aspirator to entrain ambient air prior to said first stage gas flowing into said inflatable device.

30. A method for inflating an inflatable device comprising:
storing a first stage gas in a first stage pressure vessel;
sensing the temperature of said first stage gas;
opening a remotely operated valve in response to an external signal to release said first stage gas through said valve into said inflatable device; and
thereafter initiating a second stage gas source having a gas output directed into said first stage pressure vessel, said initiating of said second stage gas source occurring after a delay period, the length of said delay period being computed based on the sensed temperature of said first stage gas to be sufficient to ensure the pressure of said first stage gas is below a predetermined level, whereby said second stage gas source augments said first stage gas flowing through said valve into said inflatable device.

31. The method of claim 30, wherein:
the length of said delay period increases with the absolute temperature of said first stage gas.

32. The method of claim 30, wherein:
said external signal comprises a signal indicative of the opening of an aircraft emergency exit door.

33. The method of claim 30, further comprising:
flowing said first stage gas through an aspirator to entrain ambient air prior to said first stage gas flowing into said inflatable device.

34. The method of claim 30, wherein:
said second stage gas source comprises:
a second stage pressure vessel having a gas exit aperture in fluid communication with said first stage pressure vessel;
a frangible seal disposed in said gas exit aperture, said frangible seal operable to open said gas exit aperture to permit gas to flow through said gas exit aperture when pressure in said second stage pressure vessel exceeds a predetermined level;
a compressed gas stored within said second stage pressure vessel; and
a pyrotechnic material contained within said second stage pressure vessel, p1 wherein said means for initiating said second stage gas source comprises an electrically initiated squib operable to initiate said pyrotechnic material.

35. A method for inflating an inflatable device comprising:
storing a first stage gas in a first stage pressure vessel;
sensing one of the physical properties of said first stage gas consisting of temperature and pressure and providing an output signal indicative of said one of the physical properties of said first stage gas;
opening a remotely operated valve in response to an external signal to release said first stage gas through said valve into said inflatable device; and
thereafter initiating a second stage gas source having a gas output directed into said first stage pressure vessel, said initiating of said second stage gas source occurring after a delay period, the length of said delay period being determined, based on said output signal indicative of said one of the physical properties of said first stage gas, to be sufficient to ensure the pressure of said first stage gas is below a predetermined level,
whereby said second stage gas source augments said first stage gas flowing through said valve into said inflatable device, wherein
said second stage gas source comprises:
a second stage pressure vessel having a gas exit aperture in fluid communication with said first stage pressure vessel;
a frangible seal disposed in said gas exit aperture, said frangible seal operable to open said gas exit aperture to permit gas to flow through said gas exit aperture when pressure in said second stage pressure vessel exceeds a predetermined level;
a compressed gas stored within said second stage pressure vessel; and
a pyrotechnic material contained within said second stage pressure vessel.

36. The method of claim 35, wherein:
said one of the physical properties of said first stage gas comprises the pressure of said first stage gas.

37. The method of claim 36, wherein:
said one of the physical properties of said first stage gas comprises the temperature of said first stage gas.

38. Apparatus for inflating an inflatable device comprising:
means for storing a first stage gas in a first stage pressure vessel;
means for sensing one of the physical properties of said first stage gas consisting of temperature and pressure with a transducer and providing an output signal indicative said of one of the physical properties of said first stage gas;
means for opening a remotely operated valve in response to an external signal to release said first stage gas through said valve into said inflatable device; and
means for initiating a second stage gas source having a gas output directed into said first stage pressure vessel, said initiating of said second stage gas source occurring after a delay period, the length of said delay period being determined based on said output signal indicative of said one of the physical properties of said first stage gas, to be sufficient to ensure the pressure of said pressurized cold gas is below a predetermined level.

39. The apparatus of claim 38, wherein:
said second stage gas source comprises:
a second stage pressure vessel having a gas exit aperture in fluid communication with said first stage pressure vessel;
a frangible seal disposed in said gas exit aperture, said frangible seal operable to open said gas exit aperture to permit gas to flow through said gas exit aperture when pressure in said second stage pressure vessel exceeds a predetermined level;
a compressed gas stored within said second stage pressure vessel; and
a pyrotechnic material contained within said second stage pressure vessel,
wherein said means for initiating said second stage gas source comprises an electrically initiated squib operable to initiate said pyrotechnic material.

40. The apparatus of claim 39, wherein
said means for sensing one of the physical properties of said first stage gas comprises a pressure transducer.

41. The apparatus of claim 40, wherein:
said means for initiating said second stage gas source comprises said pressure transducer interposed between a signal for initiating said second stage gas source and said electrically initiated squib such that said signal for initiating said second stage gas source is interrupted until the pressure in said second stage pressure vessel falls below said predetermined level.

42. The apparatus of claim 38 wherein:

said means for sensing one of the physical properties of said first stage gas comprises a temperature transducer.

43. The apparatus of claim 42 wherein:

said means for initiating said second stage gas source comprises an electronic delay circuit having a first input for receiving a signal from said temperature transducer, a second input for receiving a signal for initiating said second stage gas source and an output to said electrically initiated squib, said electronic delay circuit receiving said signal for initiating said second stage gas source and providing a signal to said electrically initiated squib after a delay period, said delay period being determined by said signal from said temperature transducer.

* * * * *